United States Patent [19]

Banerjee

[11] Patent Number: 5,147,834
[45] Date of Patent: Sep. 15, 1992

[54] GUNNING COMPOSITION

[75] Inventor: Subrata Banerjee, Wheaton, Ill.

[73] Assignee: Magneco/Metrel, Inc., Addison, Ill.

[21] Appl. No.: 749,620

[22] Filed: Aug. 19, 1991

Related U.S. Application Data

[63] Continuation of Ser. No. 545,406, Jun. 28, 1990, abandoned, which is a continuation-in-part of Ser. No. 393,990, Aug. 15, 1989, abandoned.

[51] Int. Cl.$^5$ .................................................. C04B 35/52
[52] U.S. Cl. ........................................ 501/129; 501/89; 501/90; 501/100; 501/128; 501/133; 501/144; 501/154; 106/38.9; 106/38.27; 106/38.28
[58] Field of Search ............... 501/128, 129, 100, 133, 501/144, 154, 89, 94; 106/39.9, 38.27, 38.28

[56] References Cited

U.S. PATENT DOCUMENTS

| | | | |
|---|---|---|---|
| 3,041,205 | 6/1962 | Iler | 117/129 |
| 3,067,050 | 12/1962 | Miller, Jr. | 106/65 |
| 3,353,975 | 11/1967 | Shannon | 106/65 |
| 3,432,312 | 3/1969 | Feagin et al. | 106/38.3 |
| 3,652,307 | 3/1972 | Bakker | 106/65 |
| 3,842,760 | 10/1974 | Parsons et al. | 501/100 |
| 3,892,584 | 7/1975 | Takeda et al. | 106/56 |
| 3,920,578 | 11/1975 | Yates | 252/313 S |
| 4,018,615 | 4/1977 | Mills | 106/69 |
| 4,041,199 | 8/1977 | Cartwright | 428/36 |
| 4,056,399 | 11/1977 | Kirkpatrick et al. | 106/69 |
| 4,061,501 | 12/1977 | Ivarsson et al. | 106/44 |
| 4,069,057 | 1/1978 | Kamei et al. | 106/55 |
| 4,128,431 | 12/1978 | Svec | 106/38.35 |
| 4,139,393 | 2/1979 | Chandhok | 501/128 |
| 4,226,625 | 10/1980 | Delcorio et al. | 106/38.22 |
| 4,331,773 | 5/1982 | Hongo et al. | 501/128 |
| 4,342,597 | 8/1982 | Brown | 106/38.27 |
| 4,476,234 | 10/1984 | Jones et al. | 501/89 |
| 4,751,204 | 6/1988 | Kyoden et al. | 501/89 |
| 4,780,142 | 10/1988 | Rechter | 106/84 |
| 4,800,181 | 1/1989 | Lassiter et al. | 501/89 |
| 4,916,092 | 4/1990 | Tiegs et al. | 501/89 |

FOREIGN PATENT DOCUMENTS

| | | |
|---|---|---|
| 0004509 | 3/1979 | European Pat. Off. |
| 0144303 | 6/1985 | European Pat. Off. |
| 8017506 | 7/1971 | Japan |
| 065558 | 8/1971 | Japan |
| 1101455 | 10/1984 | Japan |
| 1158872 | 12/1984 | Japan |

Primary Examiner—William R. Dixon, Jr.
Assistant Examiner—C. Bonner
Attorney, Agent, or Firm—Willian Brinks Olds Hofer Gilson & Lione

[57] ABSTRACT

An improved gunning composition for use in the steel industry includes between 60-75% by weight of a refractory base material, 10-20% by weight of silicon carbide, 7-15% by weight of ball clay, 4-8% by weight of a silica binder material, and, optionally, 5-10% by weight of a graphite material. The silica binder replaces binders composed of petroleum pitch or clay. The silica binder causes the composition to have (1) better adhesion, (2) less cracking, (3) improved strength, and (4) increased resistance to oxidation, corrosion and erosion.

13 Claims, No Drawings

GUNNING COMPOSITION

RELATED APPLICATION

This application is a continuation of application Ser. No. 07/545,406, filed Jun. 28, 1990, abandoned which is a continuation-in-part of U.S. application Ser. No. 07/393,990, filed on Aug. 15, 1989.

BACKGROUND AND SUMMARY OF THE INVENTION

This invention relates to a gunning composition for use in the steel industry for repairing and maintaining troughs, runners, ladles, spouts and other equipment used for containing and processing molten steel. The composition is intended for use primarily as a patching material, to be applied on surfaces using gunning processes well known in the iron and steel industry at temperatures of up to about 1000° F.

The gunning composition of the invention can be prepared by mixing 60-75% by weight of a refractory base material, such as calcined clay, mullite, brown fused alumina, or tabular alumina, with 10-20% by weight of silicon carbide, 7-15% by weight of ball clay, and 4-8% by weight of a binder material which includes very fine silica particles (preferably colloidal) dispersed in water. Between 5-10% by weight of a graphite material may optionally be included as a nonwetting agent and to inhibit the chemical reaction between "slag" (present in molten steel) and the refractory base material.

The use of a silica binder represents an improvement over known gunning compositions which utilize petroleum pitch or clay. The silica binder imparts several advantages to the gunning composition including (1) better adhesion to surfaces, particularly those containing carbon, (2) less cracking during evaporation of the water, (3) improved strength, and (4) increased resistance to oxidation, corrosion and erosion.

DESCRIPTION OF THE PREFERRED EMBODIMENTS

The gunning composition of the invention includes, as a major component, a refractory base material in an amount of between 60-75% by weight. The refractory base material preferably has an average particle diameter of between 30 micrometers and 7 millimeters and preferably is composed of calcined clay, mullite, brown fused alumina, tabular alumina or mixtures thereof. When calcined clay or mullite is utilized, the amount is preferably between 60-65% by weight. When brown fused alumina is used, the amount is preferably between 70-75% by weight. For tabular alumina, the amount is preferably between 65-70% by weight.

Brown fused alumina is a term of art which refers to a dark brown, glassy looking material including approximately 93-98% by weight alumina, and smaller amounts of titania, silica and iron. Tabular alumina is a term of art which refers to a white, opaque material including approximately 98.5-99.9% by weight alumina and smaller amounts of sodium oxide, silica, magnesium oxide and calcium oxide. Calcined clay is a term of art which refers to a composition having approximately 43-48% by weight alumina, 47-50% by weight silica, and smaller amounts of titania, iron and sodium oxide. Mullite is a term of art which refers to a composition containing approximately 57-73% by weight alumina, 27-40% by weight silica, and smaller amounts of impurities.

In addition to the refractory material, the gunning composition includes between 10-20% by weight of silicon carbide. The silicon carbide preferably has an average diameter of between 30 micrometers and 1.5 millimeters. The silicon carbide reduces physical erosion of the gunning composition after application, and helps prevent the base material from reacting chemically with the slag.

The gunning composition may optionally include 5-10% by weight of graphite which ultimately acts as a nonwetting agent to prevent attachment to or penetration of the base material by slag. The purpose of the graphite is to further inhibit chemical reaction between slag and base material. The graphite may be amorphous or crystalline or in the form of flakes.

The gunning composition of the invention includes between 7-15% by weight of ball clay. Ball clay is a term of art which refers to a composition including 28-30% by weight alumina, 66-70% by weight silica, and smaller amounts of sodium oxide, and titania.

Finally, the gunning composition of the invention includes a silica binder which is formed from finely dispersed (preferably colloidal) silica particles in an aqueous medium. Silica having an average diameter of preferably between 4-100 millimicrons, and most preferably 8-20 millimicrons, is initially dispersed in water in an amount of between 15-70% by weight, preferably about 40% by weight. The resulting silica binder is then mixed with the other components of the gunning composition in an amount of between 4-8% based on the weight of the resulting composition. The resulting gunning composition is in the form of a damp mixture which can be sold to users for application by gunning processes well known in the iron and steel industry. The gunning composition can also be sold as a pelletized product consisting of pellets having diameters of between 1-60 millimeters.

After the gunning composition is applied to the surface, the water initially contained therein evaporates. An inorganic bond is formed between the gunning composition and the receiving surface, leaving a solid patch of refractory composition which has improved strength and increased resistance to oxidation, corrosion and erosion compared to known gunning compositions which utilize petroleum pitch or clay binders.

While the embodiments of the invention disclosed herein are at present considered to be preferred, it is understood that various modifications and improvements can be made without departing from the spirit and scope of the invention. The scope of the invention is indicated int he appended claims, and all changes which come within the meaning and range of equivalency of the claims are intended to be embraced therein.

EXAMPLE I

A gunning composition was prepared by mixing the following components together in the stated weight percentages:
a) 10% brown fused alumina having particle sizes between 3-6 mesh,
b) 15% brown fused alumina having particle sizes between 6-14 mesh,
c) 20% brown fused alumina having particle sizes between 14-60 mesh,
d) 20% brown fused alumina having an average particle size of 100 mesh, e) 5% silicon carbide having an average particle size of 30 mesh,
f) 5% silicon carbide having an average particle size of 200 mesh,
g) 5% silicon metal having an average particle size of 200 mesh,
h) 10% ball clay,
i) 5% graphite having an average particle size of 200 mesh, and
j) 5% silica binder consisting of 40% colloidal silica having an average diameter of 20 millimicrons, in an aqueous medium.

The resulting gunning composition gave excellent adhesion, strength, resistance to cracking and resistance to oxidation, corrosion and erosion.

EXAMPLE II

A gunning composition was prepared by mixing the following components together in the stated weight percentages:
a) 10% mullite having particle sizes between 3.5-8 mesh
b) 15% mullite having particle sizes between 8-20 mesh,
c) 18% mullite having an average particle size of 20 mesh,
d) 20% mullite having an average particle size of 200 mesh,
e) 7% silicon carbide having an average particle size of 200 mesh,
f) 8% silicon metal having an average particle size of 200 mesh,
g) 10% ball clay,
h) 5% graphite having an average particle size of 200 mesh, and
i) 7% silica binder consisting of 40% colloidal silica having an average diameter of 20 millimicrons, in an aqueous medium.

The resulting gunning composition gave excellent adhesion, strength, resistance to cracking and resistance to oxidation, corrosion and erosion.

I claim:

1. A gunning composition for repairing and maintaining equipment used for containing and processing molten steel, consisting essentially of:
   at least about 60 weight percent of a refractory base material selected from the group consisting of calcined clay, mullite, brown fused alumina, tabular alumina and combinations thereof;
   greater than 10 to not more than 20 weight percent silicon carbide;
   about 7 to about 15 weight percent ball clay;
   about 5 to about 8 weight percent silicon metal;
   greater than 5 to not more than 10 weight percent graphite; and
   about 4 to about 8 weight percent of a binder formed from 15-70 weight percent colloidal silica in an aqueous medium, the colloidal silica having an average diameter of 4-100 millimicrons.

2. The gunning composition of claim 1, wherein the colloidal silica has an average diameter of 8-20 millimicrons.

3. A gunning composition for repairing and maintaining equipment used for containing and processing molten steel, consisting essentially of:
   at least about 60 weight percent calcined clay;
   greater than 10 to not more than 20 weight percent silicon carbide;
   about 7 to about 15 weight percent ball clay;
   about 5 to about 8 weight percent silicon metal;
   greater than 5 to not more than 10 weight percent graphite; and
   about 4 to about 8 weight percent of a binder formed from 15-70 weight percent colloidal silica in an aqueous medium, the colloidal silica having an average diameter of 4-100 millimicrons.

4. The gunning composition of claim 3, wherein the calcined clay is present at about 60 to about 65 weight percent.

5. The gunning composition of claim 3, wherein the colloidal silica has an average diameter of 8-20 millimicrons.

6. A gunning composition for repairing and maintaining equipment used for containing and processing molten steel, consisting essentially of:
   about 60 to about 65 weight percent mullite;
   about 10 to about 20 weight percent silicon carbide;
   about 7 to about 15 weight percent ball clay;
   about 5 to about 8 weight percent silicon metal;
   about 5 to about 10 weight percent graphite; and
   about 4 to about 8 weight percent of a binder formed from 15-70 weight percent colloidal silica in an aqueous medium, the colloidal silica having an average diameter of 4-100 millimicrons.

7. The gunning composition of claim 6, wherein the colloidal silica has an average diameter of 8-20 millimicrons.

8. A gunning composition for repairing and maintaining equipment used for containing and processing molten steel, consisting essentially of:
   at least about 60 weight percent brown fused alumina;
   greater than 10 to not more than 20 weight percent silicon carbide;
   about 7 to about 15 weight percent ball clay;
   about 5 to about 8 weight percent silicon metal;
   greater than 5 to not more than 10 weight percent graphite; and
   about 4 to about 8 weight percent of a binder formed from 15-70 weight percent colloidal silica in an aqueous medium, the colloidal silica having an average diameter of 4-100 millimicrons.

9. The gunning composition of claim 8, wherein the brown fused alumina is present at about 70 weight percent.

10. The gunning composition of claim 8, wherein the colloidal silica has an average diameter of 8-20 millimicrons.

11. The gunning composition for repairing and maintaining equipment used for containing and processing molten steel, consisting essentially of:
    at least about 60 weight percent tabular alumina;
    greater than 10 to not more than 20 weight percent silicon carbide;
    about 7 to about 15 weight percent ball clay;
    about 5 to about 8 weight percent silicon metal;
    greater than 5 to not more than 10 weight percent graphite; and
    about 4 to about 8 weight percent of a binder formed from 15-70 weight percent colloidal silica in an aqueous medium, the colloidal silica having an average diameter of 4-100 millimicrons.

12. The gunning composition of claim 11, wherein the tabular alumina is present at about 65 to about 70 weight percent.

13. The gunning composition of claim 11, wherein the colloidal silica has an average diameter of 8-20 millimicrons.

* * * * *